US007200726B1

(12) United States Patent
Gole et al.

(10) Patent No.: US 7,200,726 B1
(45) Date of Patent: Apr. 3, 2007

(54) METHOD AND APPARATUS FOR REDUCING NETWORK TRAFFIC DURING MASS STORAGE SYNCHRONIZATION PHASE OF SYNCHRONOUS DATA MIRRORING

(75) Inventors: Abhijeet P. Gole, Campbell, CA (US); Nitin Muppalaneni, Santa Clara, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 369 days.

(21) Appl. No.: 10/693,070

(22) Filed: Oct. 24, 2003

(51) Int. Cl.
*G06F 12/16* (2006.01)

(52) U.S. Cl. ............... 711/162; 714/5; 714/6; 714/15; 711/114; 711/161

(58) Field of Classification Search .............. None
See application file for complete search history.

(56) References Cited

U.S. PATENT DOCUMENTS

| | | | |
|---|---|---|---|
| 5,636,360 A | 6/1997 | Courts et al. | |
| 5,687,390 A | 11/1997 | McMillan, Jr. | |
| 5,787,485 A * | 7/1998 | Fitzgerald et al. | 711/162 |
| 5,870,537 A | 2/1999 | Kern et al. | |
| 6,178,427 B1 | 1/2001 | Parker | |
| 6,226,651 B1 | 5/2001 | Masuda et al. | |
| 6,308,283 B1 | 10/2001 | Galipeau et al. | |
| 6,499,112 B1 | 12/2002 | Milillo et al. | |
| 6,502,205 B1 | 12/2002 | Yanai et al. | |
| 6,578,160 B1 | 6/2003 | MacHardy, Jr. et al. | |
| 6,636,879 B1 | 10/2003 | Doucette et al. | |
| 6,671,705 B1 * | 12/2003 | Duprey et al. | 707/204 |
| 6,691,245 B1 | 2/2004 | DeKoning | |
| 6,728,898 B2 * | 4/2004 | Tremblay et al. | 714/6 |
| 6,735,603 B2 * | 5/2004 | Cabrera et al. | 707/200 |
| 6,745,303 B2 | 6/2004 | Watanabe | |
| 2002/0026603 A1 | 2/2002 | LeCrone et al. | |
| 2002/0083281 A1 * | 6/2002 | Carteau | 711/161 |
| 2002/0138705 A1 | 9/2002 | Suzuki et al. | |
| 2002/0178335 A1 * | 11/2002 | Selkirk et al. | 711/162 |
| 2002/0194529 A1 | 12/2002 | Doucette et al. | |
| 2003/0005355 A1 | 1/2003 | Yanai et al. | |
| 2003/0014433 A1 | 1/2003 | Teloh et al. | |
| 2003/0084242 A1 | 5/2003 | Strange et al. | |
| 2003/0167419 A1 | 9/2003 | Yanai et al. | |
| 2004/0073831 A1 | 4/2004 | Yanai et al. | |
| 2004/0098637 A1 | 5/2004 | Duncan et al. | |
| 2004/0153719 A1 | 8/2004 | Achiwa et al. | |
| 2004/0153736 A1 | 8/2004 | Viswanathan et al. | |
| 2004/0236983 A1 | 11/2004 | Burton et al. | |
| 2004/0260970 A1 | 12/2004 | Beardsley et al. | |
| 2004/0268177 A1 | 12/2004 | Ji et al. | |
| 2005/0010592 A1 | 1/2005 | Guthrie | |
| 2005/0021708 A1 * | 1/2005 | Raghuraman et al. | 709/223 |

* cited by examiner

*Primary Examiner*—B. James Peikari
(74) *Attorney, Agent, or Firm*—Blakely Sokoloff Taylor & Zafman, LLP

(57) ABSTRACT

A source storage server receives various write requests from a set of clients, logs each request in local memory, and forwards each log entry to a destination storage server at a secondary site. At a consistency point, the source storage server saves data, modified per the requests, to a first set of mass storage devices, and also initiates a synchronization phase during which process the modified data is mirrored at the secondary site. The destination storage server uses data in the received log entries to mirror at least a portion of the modified data in a second set of mass storage devices located at the secondary site, such that said portion of the modified data does not have to be sent from the source storage server to the destination storage server at the consistency point.

19 Claims, 9 Drawing Sheets

| Transfer ID | # of Blocks | Offset of First Block |
|---|---|---|
| ... | ... | ... |

FIG. 5

METHOD AND APPARATUS FOR REDUCING NETWORK TRAFFIC DURING MASS STORAGE SYNCHRONIZATION PHASE OF SYNCHRONOUS DATA MIRRORING

FIELD OF THE INVENTION

At least one embodiment of the present invention pertains to data storage and backup techniques, and more particularly, to a method and apparatus for reducing network traffic associated with synchronization phase of data mirroring.

BACKGROUND

A file server is a type of storage server which operates on behalf of one or more clients to store and manage shared files in a set of mass storage devices, such as magnetic or optical storage based disks. The mass storage devices are typically organized as one or more groups of Redundant Array of Independent (or Inexpensive) Disks (RAID). One configuration in which file servers can be used is a network attached storage (NAS) configuration. In a NAS configuration, a file server can be implemented in the form of an appliance, called a filer, that attaches to a network, such as a local area network (LAN) or a corporate intranet. An example of such an appliance is any of the NetApp Filer products made by Network Appliance, Inc. in Sunnyvale, Calif.

A file server can be used to backup data, among other things. One particular type of data backup technique is known as "mirroring". Mirroring involves backing up data stored at a primary site by storing an exact duplicate (an image) of the data at a remote secondary site. The purpose is that, if data is ever lost at the primary site, it can be recovered from the secondary site.

In a simple example of a mirroring configuration, a source file server located at the primary site may be coupled locally to a first set of mass storage devices, to a set of clients through a local area network (LAN), and to a destination file server located at a remote site through a wide area network (WAN) or metropolitan area network (MAN). The destination storage server located at the remote site is coupled locally to a second set of mass storage devices at the secondary site.

The source file server receives various read and write requests from the clients. In a system which handles large volumes of client requests, it may be impractical to save data modifications to the mass storage devices every time a write request is received from a client. The reason for this is that disk accesses tend to take a relatively long time compared to other operations. Therefore, the source file server may instead hold write requests in memory temporarily and concurrently forward them to the destination file server, and then save the modified data to the mass storage devices periodically, such as every 10 seconds or at whatever time interval is appropriate. The event of saving the modified data to the mass storage devices is called a "consistency point". At a consistency point, the source file server saves any data that was modified by the write requests to its local mass storage devices and also triggers a process of updating the data stored at the secondary site to mirror the data stored at the primary site (i.e., to be a consistent image of the data stored at the primary site). The process of updating the data at the secondary site is referred to as the "synchronization" or "sync" phase of the consistency point (CP) event, or simply "CP sync".

In the known prior art, the CP sync phase involves sending all of the data modified since the last consistency point from the source file server to the destination file server. In a system which handles large volumes of data, transmitting this data can consume significant amounts of bandwidth. In many network configurations, the available bandwidth is limited. It is desirable, therefore, to reduce the amount of network traffic required to execute the CP sync phase in a system configured to perform data mirroring.

SUMMARY OF THE INVENTION

The present invention includes a method of mirroring data. In the method, multiple requests are received at a source storage system, and modified data is saved in the source storage system based on the requests. During a synchronization phase, data stored in a destination storage system is synchronized with the data stored in the source storage system. The synchronization phase includes mirroring at least a portion of the modified data in the destination storage system without requiring said portion of the modified data to be sent from the source storage system to the destination storage system during the synchronization phase.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 5 shows a conversion table used by the destination filer;

DETAILED DESCRIPTION

A method and apparatus for reducing network traffic associated with synchronization phase of synchronous data mirroring are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

As described in greater detail below, a source storage server at a primary site receives various write requests from a set of clients. The source storage server logs each request in local non-volatile memory and forwards each log entry to a destination storage server located at a secondary site. The destination storage server also logs these log entries in its own internal memory. At a consistency point, the source storage server saves data, modified per the requests, to its local set of mass storage devices, and triggers a process of synchronizing data stored at the secondary site with the data stored at the primary site. During this synchronization, the source storage server sends to the destination storage server the modified blocks of data or, for certain blocks, references that allow the destination storage server to locate a copy of the modified blocks stored in the destination storage server as a result of the previous transmission of log entries. The destination storage server then uses either the received modified blocks or data from the previously received log entries to synchronize the data on the secondary site with the data on the primary site. In this way, at least a portion of the modified data does not have to be sent from the source storage server to the destination storage server at the consistency point.

Figure 1:
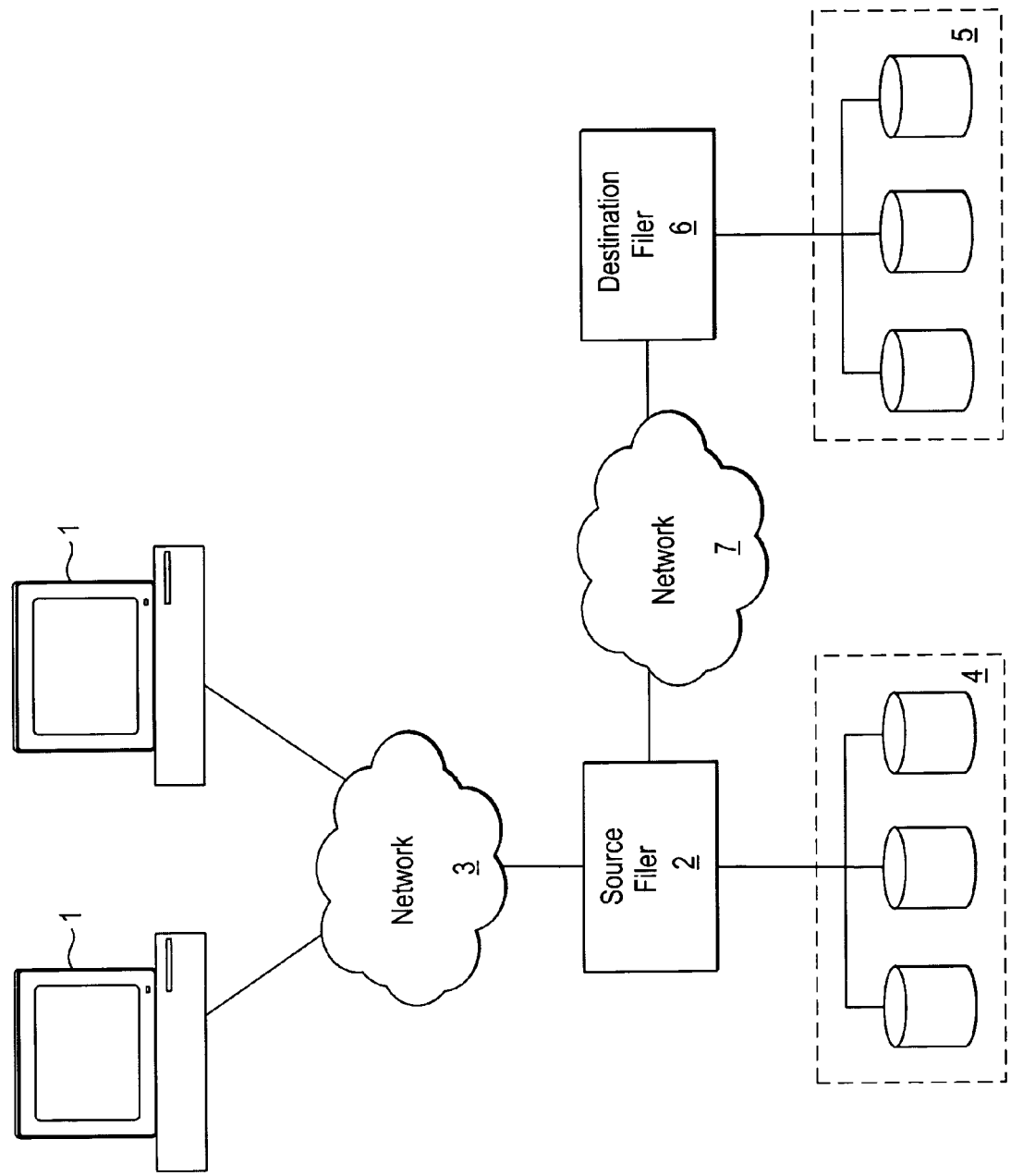
FIG. 1 illustrates an example of a network configuration to facilitate data backup using synchronous mirroring.

FIG. 1 illustrates an example of a network configuration to facilitate data backup using mirroring. A number of client processing systems ("clients") 1 are coupled to a filer 2 located at a primary site through a first network 3, such as a LAN. Each of the clients 1 may be, for example, a conventional personal computer (PC), workstation, or the like. The filer 2 provides the clients 1 with access to files stored on a first set of mass storage devices 4, such as magnetic or optical disks, which may be configured as one or more RAID groups. Data stored in mass storage devices 4 is considered to be the primary copy, which is mirrored on a second set of mass storage devices 5 located at a remote secondary site, access to which is controlled by a second filer 6. In this description, the first filer 2 is referred to as the "source filer" 2, while the second filer 6 is referred to as the "destination filer" 6. The source filer 2 and destination filer 6 are coupled to each other through a network 7, such as a WAN or MAN. Networks 3 and 7 each may be, for example, a TCP/IP network or a FibreChannel network. As described further below, certain techniques of the present invention are implemented within the source filer 2, while others are implemented within the destination filer 6.

Note that the configuration of FIG. 1 is a simple one, selected for this description to facilitate explanation of the techniques introduced herein. However, these techniques can also be applied in many other different network configurations. For example, in some alternative configurations, the destination filer 6 may serve a separate set of clients coupled to it. As another example, at least some of mass storage devices 5 may be configured to operate under the direct control of the source filer 2 and/or at least some of mass storage devices 4 may be configured to operate under the direct control of the destination filer 6 (i.e., a cluster-failover configuration). Furthermore, in some configurations, one or more additional filers may be coupled to the source filer 2 and/or to the destination filer 6.

In the illustrated system, write requests are temporarily stored in memory in the source filer 2, and data modified by the requests are saved to mass storage devices 4 from time to time, i.e., at consistency points. In this approach, there is an inherent risk (albeit small risk) of losing data modified since the last consistency point if a system failure occurs between consistency points. Consequently, the source filer 2 maintains, in an internal nonvolatile memory, a log of write requests received from clients 1 since the last consistency point. This log is referred to herein as the "NVLog".

The NVLog includes a separate entry for each write request received from a client 1. Each NVLog entry includes the data to be written according to the corresponding request. The NVLog is only used in the event of a failure, to recover data that would otherwise be lost. In the event of a failure, the NVLog is used to reconstruct the current state of stored data just prior to the failure. The NVLog is cleared and started anew after each consistency point is completed.

A separate copy of the NVLog is maintained in the destination filer 6. The copy in the destination filer 6 is created by sending each NVLog entry, at the time the entry is created (i.e., in response to a request), from the source filer 2 to the destination filer 6. Each NVLog entry is sent from the source filer 2 to the destination filer 6 in the form of one or more data transfers from the source filer 2 to the destination filer 6. Each such data transfer has a unique transfer identifier (ID). Upon receiving each NVLog entry from the source filer 2, the destination filer 6 stores the NVLog entry in its main memory and creates a corresponding NVLog entry in its own internal nonvolatile memory. As described further below, the NVLog information stored in the destination filer 6 and the transfer IDs are used (along with other information) to enable synchronization to be accomplished at a consistency point, without the need to resend all of the modified data from the primary site to the secondary site.

Figure 2:
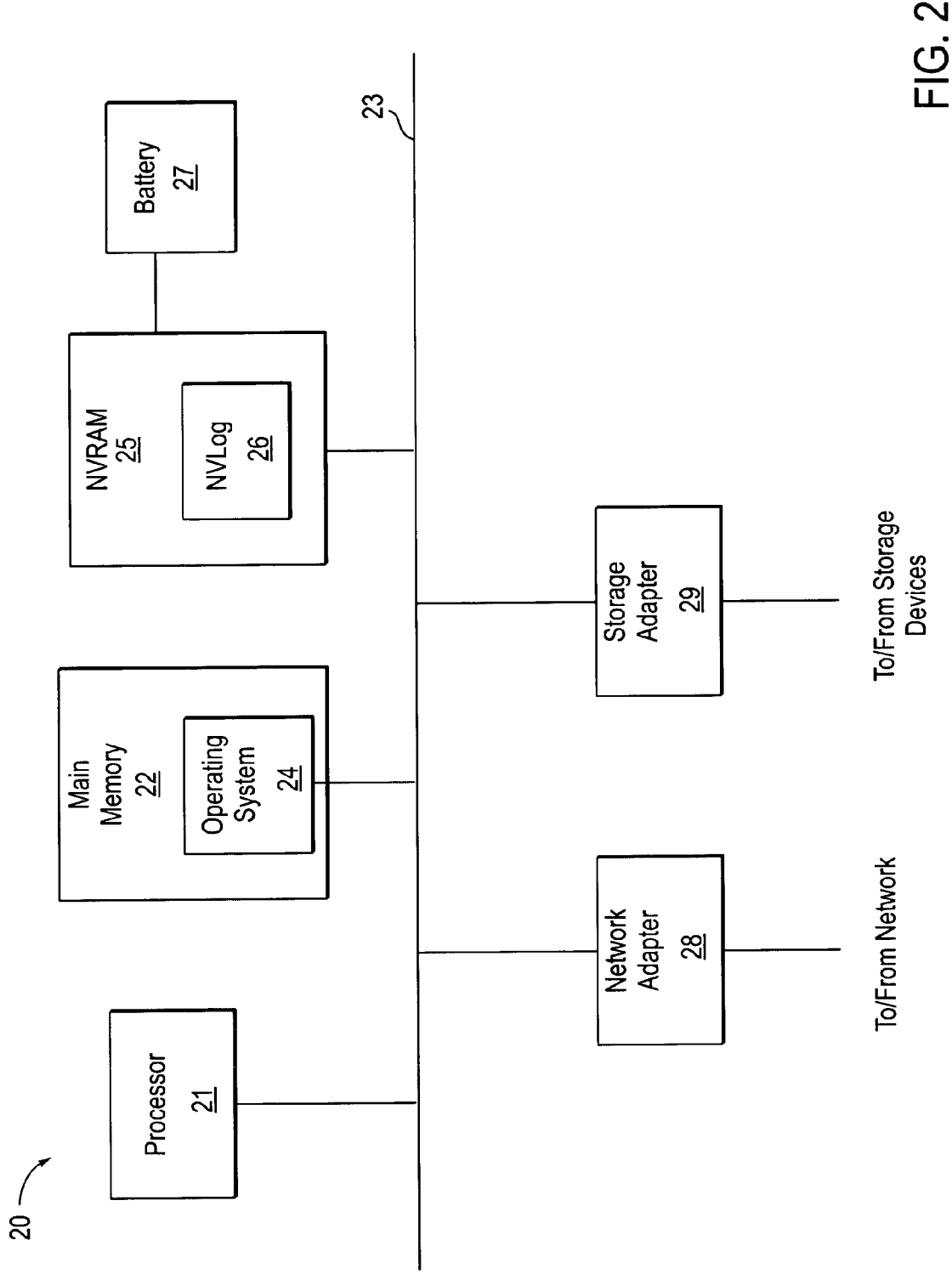
FIG. 2 is a conceptual block diagram of the architecture of a filer.

FIG. 2 shows the architecture of a filer 20, representative of the source filer 2 or the destination filer 6, according to certain embodiments of the invention. Note that certain standard and well-known components which are not germane to the present invention are not shown. The filer 20 includes a processor 21 and main memory 22, coupled together by a bus system 23. The bus system 23 in FIG. 2 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 21 is the central processing unit (CPU) of the filer 20 and, thus, controls the overall operation of the filer 20. In certain embodiments, the processor 21 accomplishes this by executing software stored in main memory 22. The processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The main memory 22, which is generally some form of random access memory (RAM), stores the operating system 24 of the filer 20. Techniques of the present invention may be implemented within the operating system 24, as described further below. Also coupled to the processor 21 through the bus system 23 is another memory, i.e., a non-volatile RAM (NVRAM) 25. The NVRAM 25 stores an NVLog 26, such as described above. The NVRAM 35 may be formed by a conventional form of RAM coupled to an uninterruptible backup power source such as a battery 27.

Also connected to the processor 21 through the bus system 23 are a network adapter 28 and a storage adapter 29. The network adapter 28 provides the filer 20 with the ability to communicate with remote devices, such as clients and/or another filer, over a network and may be, for example, an Ethernet adapter. The storage adapter 29 allows the filer to access the external mass storage devices and may be, for example, a Fibre Channel adapter or SCSI adapter.

Figure 3:
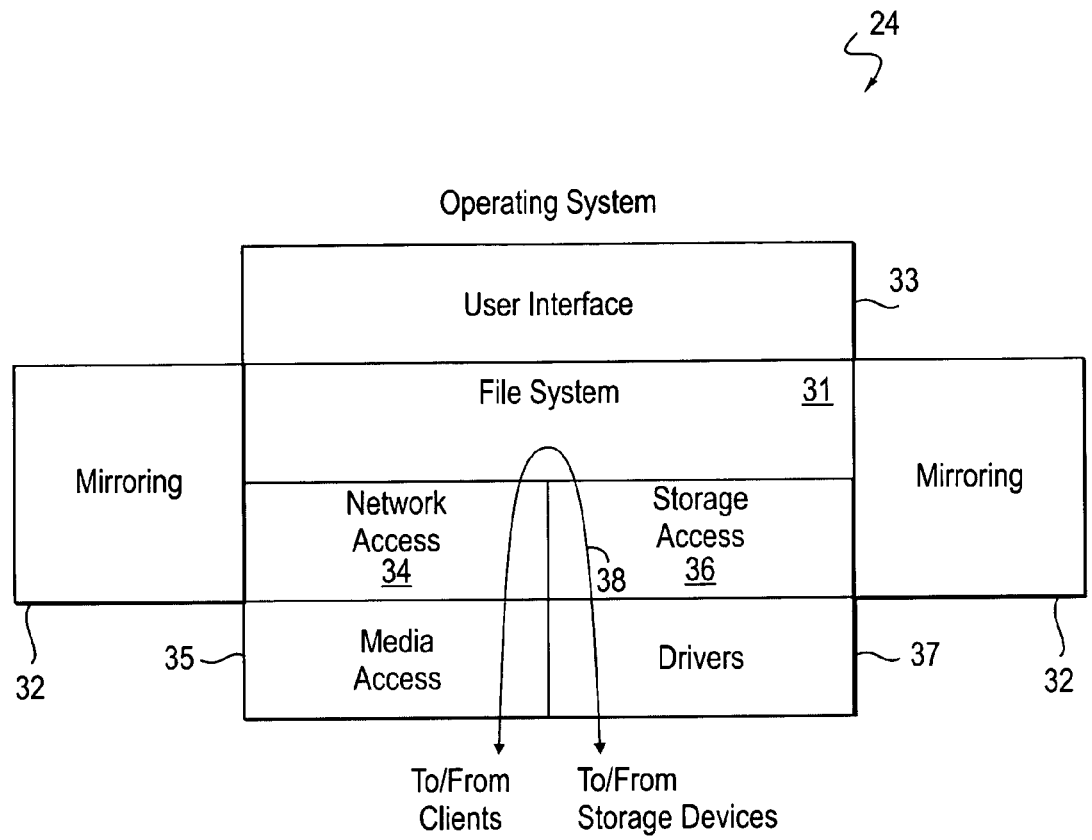
FIG. 3 is a block diagram of the operating system of a filer.

FIG. 3 illustrates the operating system 34 of the filer 20, according to certain embodiments of the invention. As can be seen, the operating system 24 includes a number of layers. The core of the operating system 24 is the file system 31 which, among other responsibilities, executes read and write operations on the mass storage devices in response to client requests, maintains directories, and manages consistency point operations. An example of a file system suitable for this purpose is the Write Anywhere File Layout (WAFL) file system from Network Appliance, such as used in the NetApp Filers. The file system 31 operates on blocks of data of a predetermined size, such as 4 kbytes. Also shown in FIG. 3 is the logical data path 38 from clients to mass storage devices, through the file system 31.

Above the file system 31, the operating system 24 also includes a user interface 33, through which a network administrator or other user can control and/or configure the filer (e.g., remotely from a management station). The user interface 33 may generate a command line interface and/or a graphical user interface for this purpose.

Below the file system 31, on the client side the operating system 24 includes a network layer 34 and, at the lowest level, a media access layer 35. The network access layer 34 implements any of various protocols used to communicate with client devices, such as network file system (NFS), common Internet file system (CIFS) and/or hypertext transport protocol (HTTP). The media access layer 35 includes one or more drivers which implemented the protocols used to communicate over the network, such as Ethernet.

Below the file system 31 on the storage device side, the operating system 24 includes a storage access layer 36 and, at the lowest level, a driver layer 37. The storage access layer 36 implements a disk storage protocol such as RAID, while the driver layer 37 implements a lower-level storage device access protocol, such as Fibre Channel or SCSI.

The operating system of 24 also includes a mirroring module 32, which is operatively coupled to the file system 31 and the storage access layer 36. The mirroring module 32 controls the synchronization of data at the remote secondary site with data stored at the primary site. The techniques introduced herein may be implemented at least partially within the mirroring module 32.

As mentioned above, NVLog information stored in the destination filer 6 is used to enable synchronization at a consistency point (i.e., CP sync), without the need to resend all of the modified data from the primary site to the secondary site during CP sync. Certain data structures are used by the filers 2 and 6 in order to accomplish this. In particular, the source filer 2 maintains a transfer ID table and a block number, while the destination filer maintains a conversion table. The use of these data structures will now be described with reference to FIGS. 4 and 5.

Figure 4:
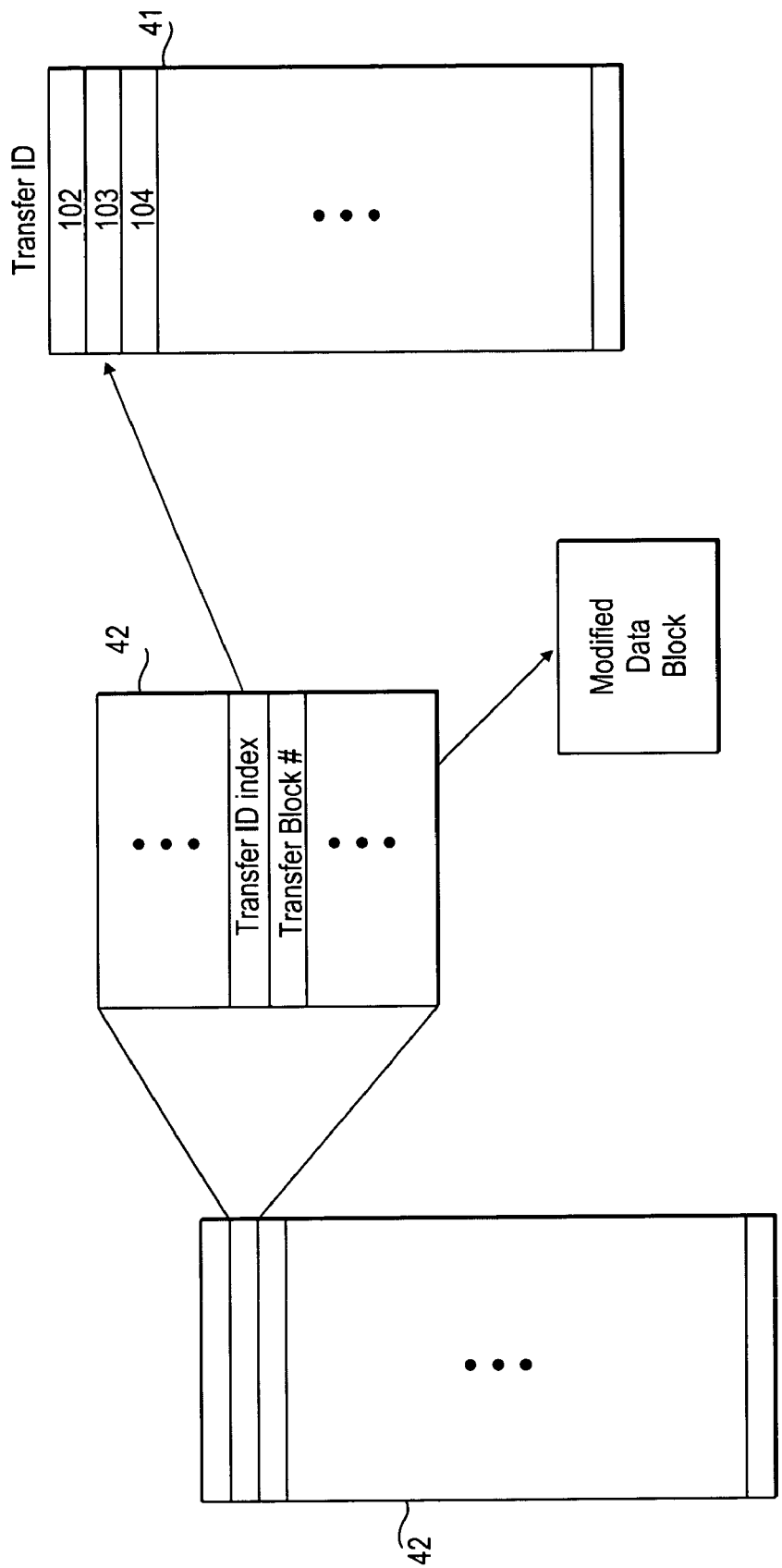
FIG. 4 shows a set of buffer descriptors and a transfer ID table used by the source filer.

As shown in FIG. 4, the transfer ID table 41 in the source filer 2 stores the transfer IDs of all of the data transfers used to transfer NVLog entries from the source filer 2 to the destination filer 6 since the last consistency point. In addition, the file system 31 in each filer also maintains a set of buffer descriptors 42, including one buffer descriptor for every block of data that the filer manages. The buffer descriptor 42 of each block includes various items of information describing that block, such as the location of the block, a checksum, container information, etc.

In the source filer 2, for every client request that gets entered in the NVLog (e.g., for the write requests), the blocks that are wholly modified (i.e., the entire block is overwritten by the request) are identified. In each wholly modified block's buffer descriptor are stored two additional items of information, which are not included in the buffer descriptors of blocks that are not wholly modified: 1) an index to an entry in the transfer ID table 41, and 2) a transfer block number. The index indicates the location in the transfer ID table 41 that contains the ID of the data transfer in which the corresponding block was sent to the destination filer 6, when the corresponding NVLog entry was forwarded to the destination filer 6. The transfer block number indicates the location of the block within that data transfer, i.e., a particular block within that data transfer.

Figure 5:
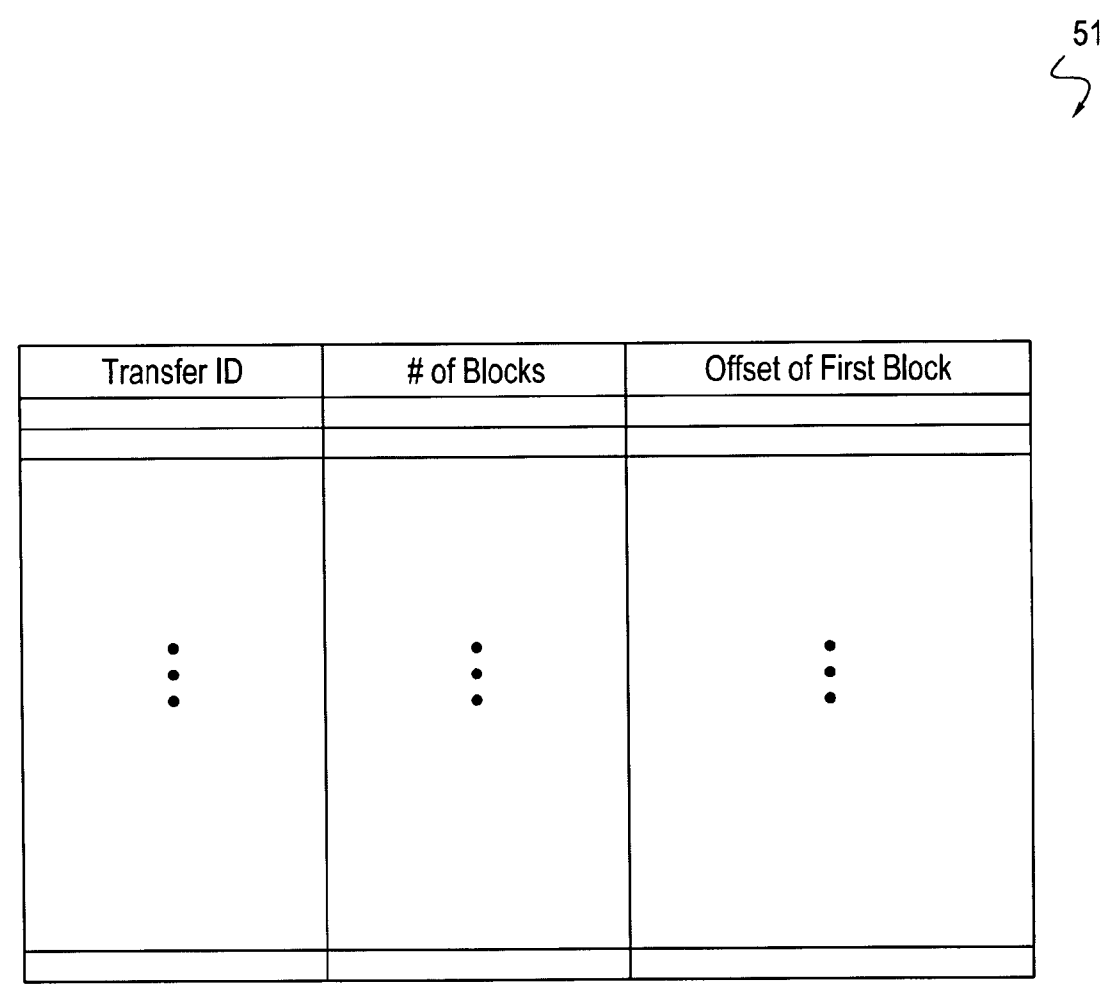

As shown in FIG. 5, the conversion table 51 in the destination filer 6 contains associations of {transfer ID, transfer block number} pairs with offsets that indicate locations in local stable storage of the destination filer 6 where the corresponding entry resides. All transfer IDs and transfer block numbers received from the source filer 2 during NVLog forwarding are stored in the conversion table, along with the corresponding offsets.

When a consistency point operation is performed on the source filer 2, all blocks modified since the last consistency point are queued up waiting to be sent to the destination filer 6. At this point, each such block is examined to see if its buffer descriptor 42 contains a valid index to the transfer ID table 41. If so, the corresponding transfer ID and transfer block number are sent to the destination filer 6, rather than sending the entire block. If the buffer descriptor of that block does not contain a valid index to the transfer ID table 41, then the actual block is sent to the destination filer 6. In either case, the source filer 2 also sends a volume block number (VBN), which indicates the exact location where the block is being stored in mass storage devices 4 (at the primary site). The VBN is subsequently used by the destination filer 6 at a consistency point to store the block in the exact mirror of that location at the secondary site.

On the destination filer 6, when data is received from the source filer 2 during a consistency point operation, the data is examined to determine whether it is an actual block or merely a reference to a block in the form of a transfer ID and transfer block number. In the former case, the destination filer 6 saves the received block to the location in its mass storage devices 5 indicated by the received VBN. In the latter case, the destination filer 6 uses the received transfer ID and transfer block number to reference into the conversion table 51, to locate the corresponding block in its local stable storage (e.g., in mass storage devices 5). Once the block has been located in its local stable storage and retrieved, the destination filer 6 saves the block to the location in mass storage devices 5 indicated by the received VBN.

Figure 6:
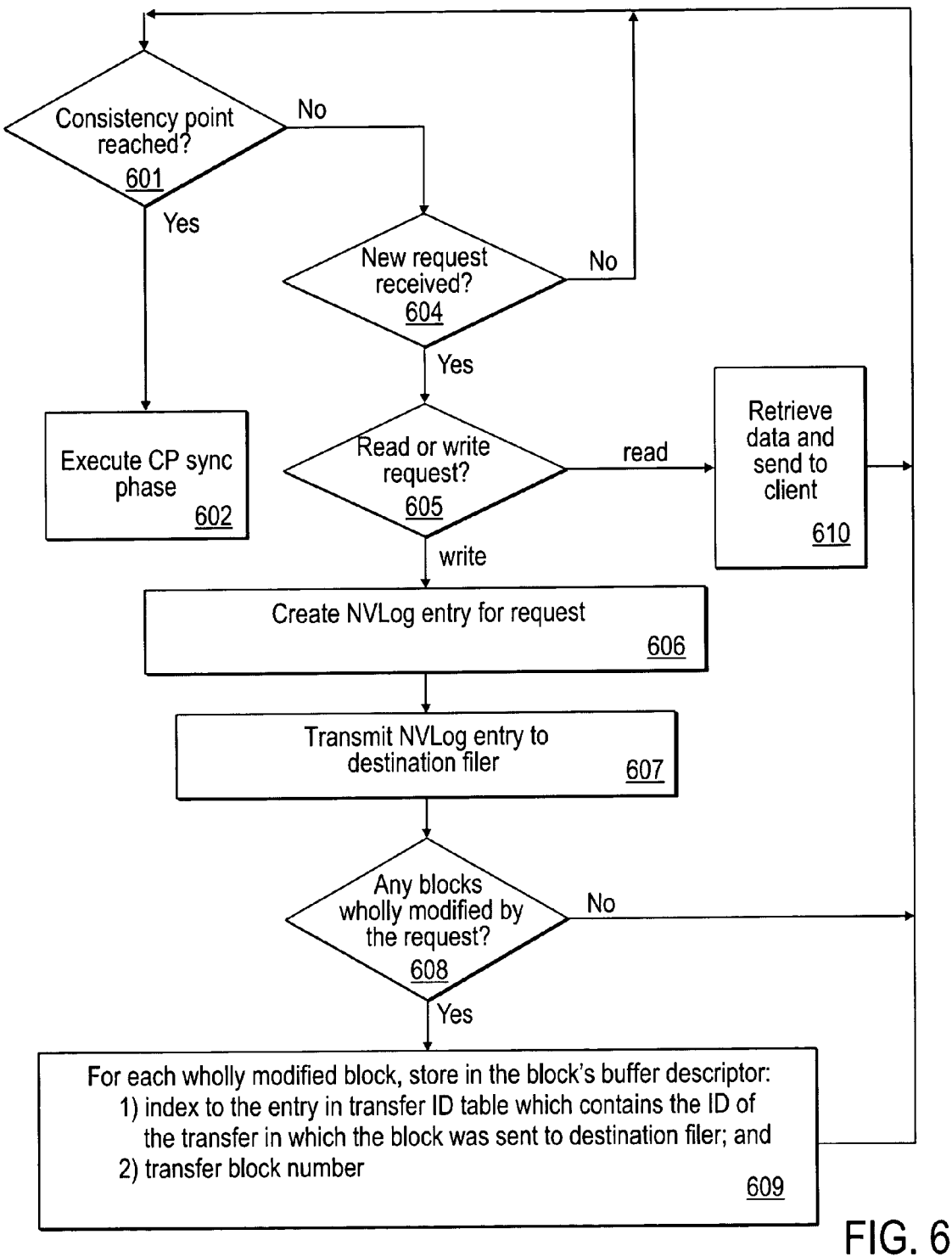
FIG. 6 illustrates the operation of a source filer in processing requests from clients.

The operation of the source filer 2, for purposes of data mirroring, will now be further described with reference to FIGS. 6 and 7. FIG. 6 illustrates the operation of the source filer 2 in processing requests from clients. Initially, the source filer 2 determines (601) whether the next consistency point has been reached yet. When the next consistency point occurs, the source filer 2 initiates the CP sync phase (602), which is described further below, and which includes saving any modified data to its local mass storage devices 4.

If the next consistency point has not been reached, then the source filer 2 determines whether a new request has been received (604) from a client 1. If no new request has been received, the process repeats from the beginning. If a new request has been received and the request is a read request (605), the source filer 2 retrieves the requested data and sends it to the requesting client (610). If the request is a write request, the source filer 2 creates an NVLog entry for the request in its NVRAM (606). The source filer 2 then transmits the NVLog entry (607) to the destination filer 6, by initiating one or more data transfers. Each such data transfer includes one or more modified blocks of data and is assigned a unique transfer ID any (beyond this, the specific format of the data transfer is unimportant for purposes of understanding the present invention). The source filer 2 then identifies any blocks which have been wholly modified as a result of the request (608) and stores, in the buffer descriptor for such block (609): 1) the index to the entry in the transfer ID table which contains the ID of the data transfer in which the block was sent to the destination filer; and 2) the corresponding transfer block number.

Figure 7:
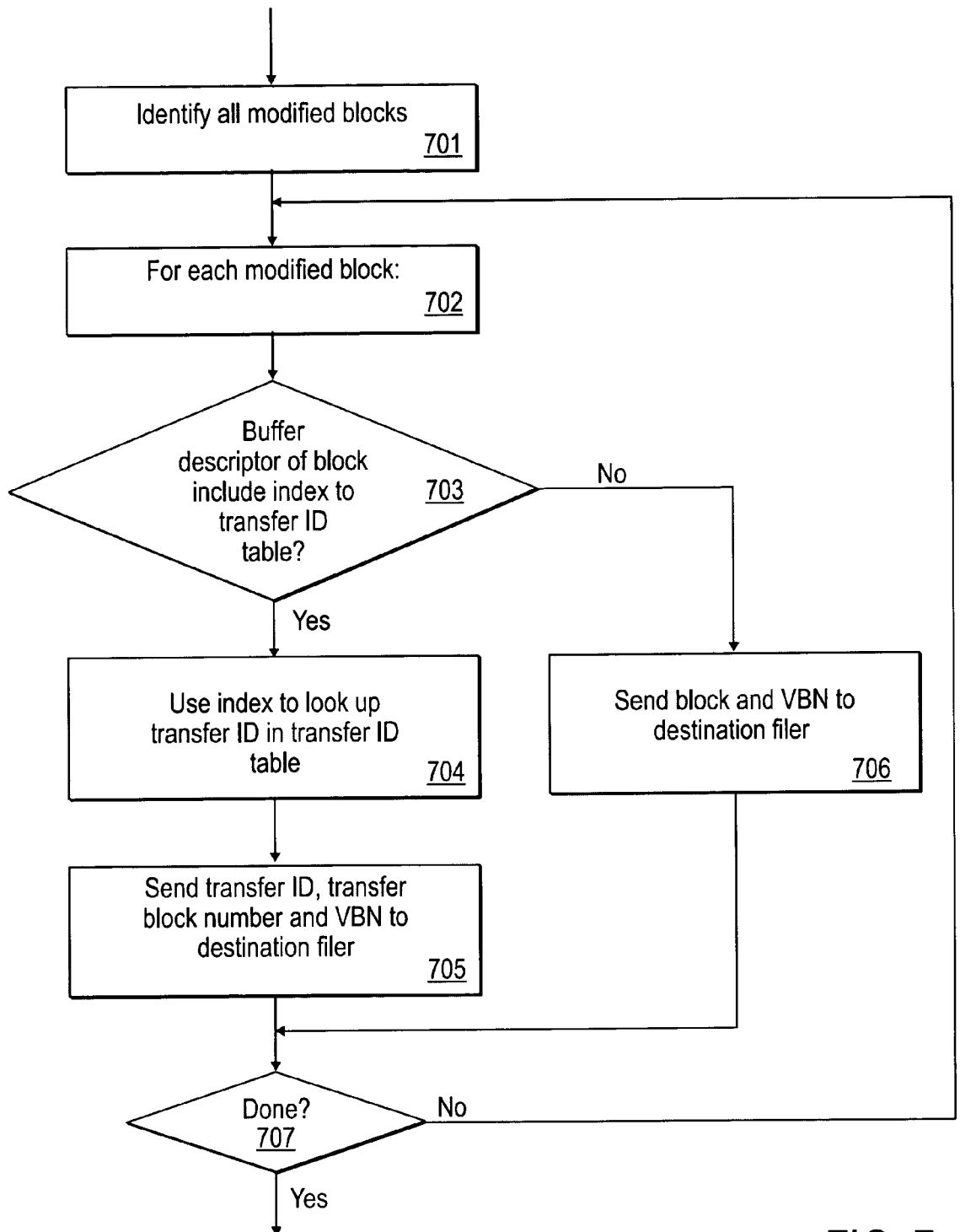
FIG. 7 illustrates a process formed by the source filer during the CP sync phase.

FIG. 7 illustrates an example of the CP sync phase on the source filer 2. Initially, the source filer 2 identifies all blocks which have been modified since the last consistency point (701). For each block modified since the first consistency point (702, 707), the source filer 2 determines whether the buffer descriptor of that block includes an index entry pointing to the transfer ID table (703). If the buffer descriptor does not include a valid index to the transfer ID table, then the source filer 2 sends the actual modified block, along with the corresponding VBN, to the destination filer 6 (706). If the buffer descriptor includes a valid index to the transfer ID table, then the source filer 2 uses the index to look up the corresponding transfer ID of the block in the transfer ID table (704). The source filer 2 then sends the transfer ID and the transfer block number of the block to the destination filer 6 (705), in place of the actual block, along with the corresponding VBN.

The operation of the destination filer 6, for purposes of data mirroring, will now be further described with reference to FIGS. 8 and 9. There are two separate processes which operate concurrently on the destination filer 6. One process receives and processes NVLog entries from the source filer 2, while the other process responds to a CP sync phase being initiated by writing the modified data to mass storage on behalf of the source.

Figure 8:
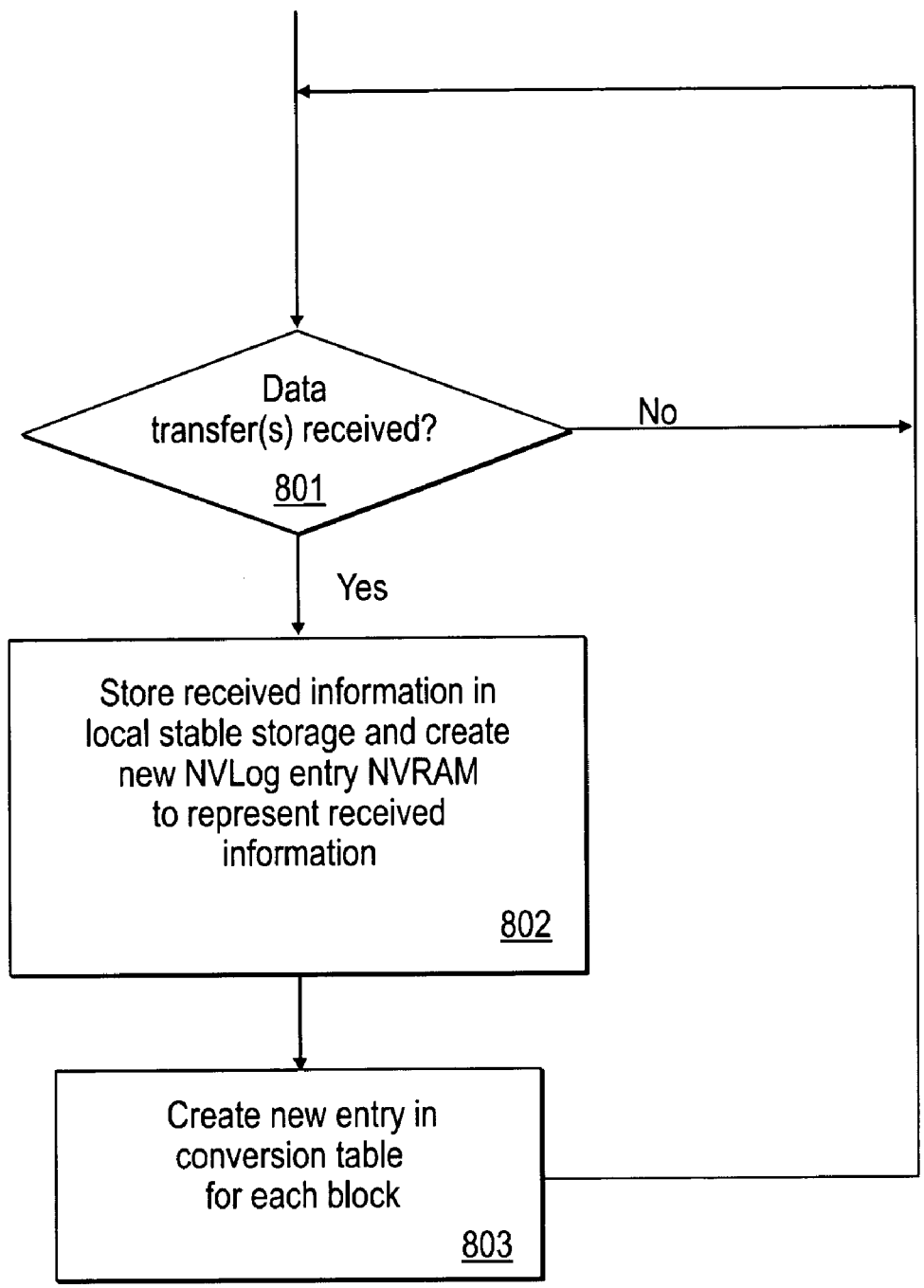
FIG. 8 shows the handling on the destination filer of NVLog entries received from the source filer.

FIG. 8 shows the first process mentioned above, i.e., the handling on the destination filer 6 of NVLog entries received from the source filer 2. The destination filer 6 first determines (801) whether one or more data transfers have been received from the source filer 2. For purposes of this description, it may be assumed that the data transfer(s) represent an NVLog entry, although the destination filer 6 does not have to be aware of the type of information contained in the data transfer(s). If any such data transfers have been received, the destination filer 6 stores the received information in its local stable storage (e.g., in one of its mass storage devices) and creates a new NVLog entry of its own NVRAM to represent the received information (802). In addition, the destination filer 6 creates a new (803) in its conversion table 51 for each received data transfer. For each such NVLog entry, the new entry in the conversion table includes the transfer ID, the number of blocks, and the offset of the location where the first block is being stored in local stable storage. The process then repeats (801).

Figure 9:
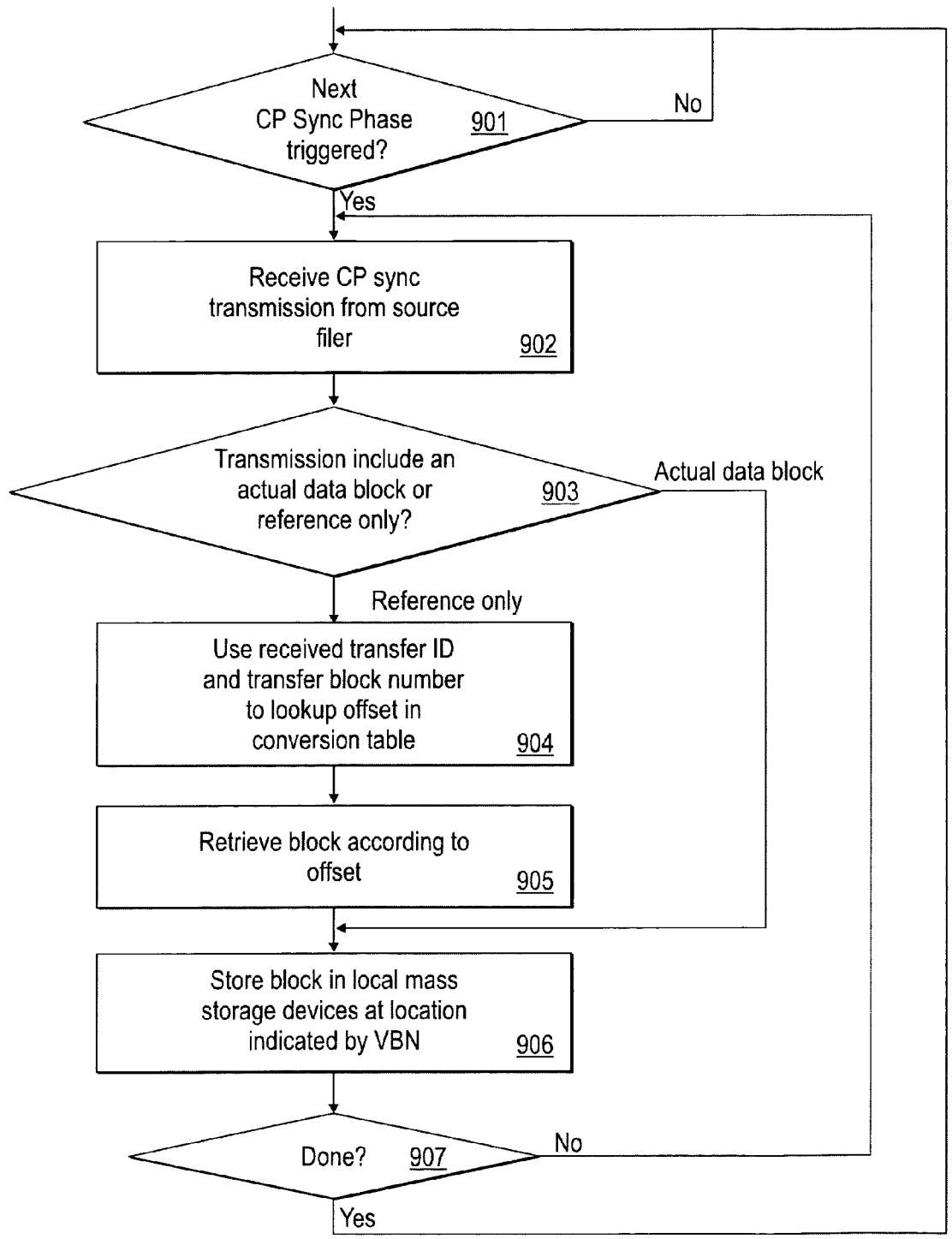
FIG. 9 shows a process formed by the destination filer during the CP sync phase.

FIG. 9 shows an example of the process formed by the destination filer 6 during the CP sync phase. The CP sync phase on the destination filer 6 may be triggered in any suitable manner, such as a trigger signal from the source filer 2. Initially, when the CP sync phase is triggered (901), the destination filer 6 receives a CP sync transmission (902) from the source filer 2. In response, the destination filer 6 determines whether the transmission includes an actual data block, or instead, includes only a reference to a data block in the form of a transfer ID and transfer block number (903). If an actual data block has been received, the destination filer 6 stores the block (906) in its mass storage devices 5 at the location indicated by the VBN which accompanied the received data block. If an actual block has not been received (i.e., a transfer ID and transfer block number have been received instead), then the destination filer 6 uses the received transfer ID and transfer block number to lookup (904) in the conversion table 51 the offset of the referenced block, as it is stored in local stable storage. The destination filer 6 then retrieves the block according to the offset (905), and stores the block (906) in its mass storage devices 5 at the location indicated by the VBN which accompanied the received data block. The process then repeats until all blocks modified since the last consistency point have been saved to mass storage devices 4 and mirrored in mass storage devices 5 (907).

Note that other implementations can be used to accomplish the above-described results. As one alternative, for example, the source filer 2 can maintain a table or other data structure that maps blocks to the destination file offsets. In that case, the reference sent by the source filer 2 would be the offset itself, avoiding the need to convert from transfer ID to offset on the destination filer 6 during CP sync.

The techniques introduced above have been described in the context of a NAS environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

Thus, a method and apparatus for reducing network traffic associated with synchronization phase of synchronous data mirroring have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of mirroring data stored in a source storage system, the method comprising:
   receiving at the source storage system a plurality of requests from a set of clients, the requests indicating modifications to be made to stored data;
   saving modified data in the source storage system based on the requests;
   receiving the modified data at a destination storage system from the storage system, wherein the destination storage system is configured to receive the modified data from the source storage system and not from any client of the set of clients; and during a synchronization phase, synchronizing data stored in the destination storage system with the data stored in the source storage system, including mirroring at least a portion of the modified data in the destination storage system without requiring said portion of the modified data to be sent from the source storage system to the destination storage system during the synchronization phase.

2. A method as recited in claim 1, wherein said portion of modified data comprises a plurality of blocks of data, and wherein said mirroring at least a portion of the modified data in the destination storage system comprises sending a reference from the source storage system to the destination storage system for each block of said portion of modified data, each said reference for use by the destination storage system to locate the corresponding block in storage controlled by the destination storage system.

3. A method as recited in claim 2, wherein each said reference comprises a transfer ID indicating a data transfer in which the corresponding block was previously sent from the source storage system to the destination storage system.

4. A method as recited in claim 3, wherein each said reference comprises an indication of a location at which the corresponding block was located within the data transfer.

5. A method as recited in claim 3, wherein said mirroring at least a portion of the modified data in the destination storage system comprises storing in the source storage subsystem an association between the transfer IDs and blocks wholly modified by the requests.

6. A method as recited in claim 5, wherein said mirroring at least a portion of the modified data in the destination storage system comprises storing in the destination storage subsystem an association between the transfer IDs and a plurality of offsets, the offsets indicating locations in local storage of the destination storage system at which corresponding blocks of data are stored.

7. A method as recited in claim 1, wherein said portion of modified data consists of blocks wholly modified as a result of the requests.

8. A method as recited in claim 1, further comprising:
creating a log entry in the source storage system for each of the write requests; and
transmitting each log entry from the source storage system to the destination storage system prior to the synchronization phase, wherein said mirroring at least a portion of the modified data in the destination storage system comprises using data from at least some of the log entries in the destination storage system to mirror said portion of modified data in the destination storage system.

9. A method of mirroring data, the method comprising, in a first storage appliance:
receiving a plurality of requests to write data from a set of client devices, the requests for causing modification of a plurality of blocks of data stored in a first set of non-volatile storage devices coupled to the first storage appliance;
storing modified data in the first set of non-volatile storage devices based on the requests;
initiating a process of synchronizing data in the first set of non-volatile storage devices with data stored in a second set of non-volatile storage devices coupled to a second storage appliance, including sending each block of a first subset of the plurality of blocks from the first storage appliance to the second storage appliance, to cause the second storage appliance to store the blocks of the first subset in the second set of non-volatile storage devices, and for each block of a second subset of the plurality of blocks, sending a reference from the first storage appliance to the second storage appliance, instead of sending the corresponding block, each said reference identifying a data transfer during which the corresponding block was previously sent from the first storage appliance to the second storage appliance and a location of said block within the data transfer, each said reference for use by the second storage appliance to locate the corresponding block in local storage of the second storage appliance and to store the corresponding block in the second set of non-volatile storage devices.

10. A method as recited in claim 9, further comprising, prior to initiating the process of synchronizing data:
creating a log entry for each of the requests in the first storage appliance; and
transmitting the log entry for each of the requests to the second storage appliance, by using one or more data transfers, each of the data transfers including one or more of the modified blocks and having a unique transfer ID.

11. A method as recited in claim 10, wherein the second subset of the plurality of blocks comprises blocks which have been wholly modified as a result of the requests.

12. A method as recited in claim 10, wherein said sending a reference from the first storage appliance to the second storage appliance comprises, for each block of the second subset of the plurality of blocks:
sending a transfer ID and a block number associated with the block to the second storage appliance, the transfer ID identifying a data transfer in which the block was sent to the second storage appliance during said transmitting the log entry, the block number indicating a location of the block within said data transfer.

13. A method as recited in claim 9, wherein prior to the process of synchronizing data, the second storage appliance receives the modified data only from the first storage appliance.

14. A method of mirroring data, the method comprising, in a first storage server:
receiving a plurality of requests to write data from a set of client devices, the requests for causing modification of a plurality of blocks of data;
creating a log entry for each of the requests;
transmitting the log entry for each of the requests to a second storage server located at a secondary site, using one or more data transfers, each of the data transfers including one or more of the modified blocks and having a unique transfer ID;
saving modified data in a first set of non-volatile storage devices coupled to the first storage server based on the requests; and
initiating synchronization of data in the first set of non-volatile storage devices with data stored in a second set of non-volatile storage devices coupled to the second storage server, wherein said initiating synchronization includes
for each of the plurality of blocks which has been only partially modified as a result of the requests, sending the partially modified block to the second storage server, and for each of the plurality of blocks which has been wholly modified as a result of the requests, sending a transfer ID and a block number associated with the wholly modified block to the second storage server instead of the wholly modified block, the transfer ID identifying a data transfer in which the wholly modified block was sent to the second storage server during said transmitting the log entry, the block number indicating a location of the wholly modified block within said data transfer.

15. A method as recited in claim 14, further comprising:
maintaining a transfer ID structure including each said transfer ID;
maintaining a buffer descriptor for each of the blocks;
in response to said transmitting the log entry for each of the requests to a second storage server, storing in the buffer descriptor for each block wholly modified as a result of the requests,
    an index to a corresponding transfer ID stored in the transfer ID structure, and
    a block number to indicate a location of the corresponding wholly modified block within a data transfer in which the corresponding wholly modified block was sent to the second storage server during said transmitting the log entry.

16. A method as recited in claim 15, further comprising, in the second storage server:
receiving the corresponding log entry transmitted from the first storage server for each of the plurality of requests, including receiving the data transfers;
storing each of the received log entries in local storage of the second storage server, including storing the blocks contained in the data transfers;
storing each of the transfer IDs of the data transfers in association with a corresponding offset, each offset indicating a location in the local storage of the second storage server at which a block transferred in the corresponding data transfer is stored;
during said synchronization of data, for each of the plurality of blocks which has been modified as a result of the requests,
    receiving from the first storage server either a modified block or a transfer ID and block number of a modified block;
    if a modified block has been received from the first storage server, then storing the modified block in the second set of storage devices; and
    if a transfer ID and block number of a modified block have been received from the first storage server, then using the received transfer ID to identify the offset associated therewith in the local storage by;
        using the identified offset to retrieve the modified block from the local storage, and
        storing the modified block retrieved from the local storage in the second set of storage devices.

17. A system for mirroring data, the system comprising:
a first storage appliance to manage a first set of mass storage devices at a first location, including to receive a plurality of write requests from a set of client devices and to save modified data in the first set of mass storage devices at a consistency point based on the write requests; and
a second storage appliance connected to the first storage appliance via a network at a second location, to manage a second set of mass storage devices, including to receive the modified data from the first storage appliance, wherein the second storage appliance is configured to receive the modified data from the first storage appliance and not from any client of the set of client devices, the second storage appliance further to mirror at least a portion of the modified data in the second set of mass storage devices at the consistency point without receiving said portion of modified data from the first storage appliance or the first set of mass storage devices at the consistency point.

18. A source storage server comprising:
a processor; and
a memory storing instructions which, when executed by the processor, cause the source storage server to perform a process that includes:
    receiving a plurality of requests to write data from a set of client devices, the requests for causing modification of a plurality of blocks of data stored in a first set of non-volatile storage devices coupled to the source storage server;
    storing modified data in the first set of non-volatile storage devices based on the requests;
    initiating a process of mirroring data in the first set of non-volatile storage devices onto a second set of non-volatile storage devices associated with a remote destination storage server, including
        sending each block of a first subset of the plurality of blocks to the remote destination storage server, to cause the remote destination storage server to store the blocks of the first subset in the second set of non-volatile storage devices, and
        for each block of a second subset of the plurality of blocks, sending a reference to the remote destination storage server, instead of sending the corresponding block, each said reference identifying a data transfer during which the corresponding block was previously sent from the source storage server to the remote destination storage server and a location of said block within the data transfer, each said reference for use by the remote destination storage server to locate the corresponding block in local storage of the remote destination storage server and to store the corresponding block in the second set of non-volatile storage devices.

19. A destination storage server comprising:
a processor; and
a memory storing instructions which, when executed by the processor, cause the destination storage server to perform a process that includes:
    receiving at the destination storage server modified data representing a plurality of requests received by a source storage server from a set of clients, the requests indicating modifications to be made to stored data, wherein the destination storage server is configured to receive the modified data only from the source storage server and not from any client of the set of clients; and
    during a synchronization phase, synchronizing data maintained by the destination storage server with data maintained by the source storage server, including mirroring at least a portion of the modified data in the destination storage server without said portion of the modified data having to be sent from the source storage server to the destination storage server during the synchronization phase, by using references to said portion of modified data, said references being received at the destination storage server from the source storage server during the consistency point, each said reference identifying a data transfer during which a corresponding block was previously sent from the source storage server to the destination storage server and a location of said block within the data transfer, wherein the destination storage server uses said references to locate corresponding blocks of modified data in local storage of the destination storage server.

* * * * *